United States Patent [19]

de Montigny et al.

[11] 4,251,596
[45] Feb. 17, 1981

[54] PRODUCTION OF NON-STICK COATINGS

[75] Inventors: Armand de Montigny; Hans Toepsch, both of Leverkusen, Fed. Rep. of Germany

[73] Assignee: Bayer Aktiengesellschaft, Leverkusen, Fed. Rep. of Germany

[21] Appl. No.: 948,935

[22] Filed: Oct. 6, 1978

[30] Foreign Application Priority Data

Oct. 28, 1977 [DE] Fed. Rep. of Germany ....... 2748406

[51] Int. Cl.³ .............................................. B32B 9/04
[52] U.S. Cl. .................... 428/447; 260/185; 427/387; 427/391; 428/452; 528/18; 528/31; 528/33
[58] Field of Search ...................... 427/387, 391, 395; 428/447, 452; 544/69; 528/18, 28, 33; 260/185

[56] References Cited
U.S. PATENT DOCUMENTS

| | | | |
|---|---|---|---|
| 3,467,686 | 9/1969 | Creamer | 544/69 |
| 3,628,996 | 12/1971 | Weber | 427/387 |
| 3,849,359 | 11/1974 | Nitzsche et al. | 428/447 |
| 3,936,578 | 2/1976 | Dumoulin et al. | 428/447 |
| 4,016,163 | 4/1977 | Kanner et al. | 544/69 |
| 4,059,581 | 11/1977 | Prokai | 544/69 |

FOREIGN PATENT DOCUMENTS 1111156  4/1968  United Kingdom ...................... 428/447

Primary Examiner—Michael R. Lusignan
Assistant Examiner—Sadie L. Childs
Attorney, Agent, or Firm—Sprung, Felfe, Horn, Lynch & Kramer

[57] ABSTRACT

In the production of non-adherent coated paper substrate by applying to the substrate a solvent-containing mixture comprising (A) 100 parts by weight of an $\alpha,\omega$-dihydroxypolydimethylsiloxane having a viscosity between $10^5$ and $5.10^7$ cP at 20° C., (B) about 1 to 20 parts by weight of a polyorganosiloxane which is terminally blocked with trimethylsiloxy groups, contains Si-bonded hydrogen and has about 10 to 40 $CH_3Si(H)O$ units, and (C) about 1 to 20 parts by weight of a heavy metal carboxylate or dialkyl-tin carboxylate, and then heating the substrate to harden the coating, the improvement which comprises including in the mixture applied to the substrate (D) about 0.5 to 10 parts by weight of disilamorpholinesiloxane which is obtained by reacting a chloromethylpolymethylsiloxane of the formula

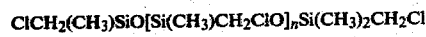

in which n denotes a value between 2 and 200, with at most an equivalent amount of a primary $C_{4-18}$ alkyl or alkenyl or cycloalkylamine, e.g. butylamine, hexylamine, cyclohexylamine, 2-ethylhexylamine and allylamine. The coating hardens in a very short time in a drying oven but at normal temperatures the mass has a relatively long pot life.

5 Claims, No Drawings

PRODUCTION OF NON-STICK COATINGS

The present invention relates to a process for providing thin substrates with an adhesion-reducing finish by means of organopolysiloxane coatings.

It is known that surfaces of paper or other solid substances can be coated with organopolysiloxanes in order to prevent sticky substances from adhering firmly to these surfaces (compare, for example, W. Noll, "Chemie und Technologie der Silicone" ("Chemistry and Technology of Silicones"), Weinheim 1968, page 520/521 and British Patent Specification No. 1,111,156).

However, ever higher demands are being made on the processes for the production of non-stick coatings based on polysiloxane. Coating processes are required which are able to lead to completely hardened coatings after very short heating times, that is to say high machine speeds, without these properties being paid for by other disadvantages. Thus, an extremely short hardening time in a drying tunnel should not lead to a drastic reduction in the residence time in the application system, which should be at least 8 hours at room temperature:

It would therefore be desirable for coating systems which react very rapidly at the operating temperatures to have a processing time of considerably more than 8 hours at room temperature. It would be ideal if the processing time were only limited by the evaporation of the solvent present and not by gelling or in some cases by inactivation of the mixture.

A number of processes have indeed been disclosed in the past, but they are all still far removed from these ideal concepts. For example, a process has recently been described in DT-AS (German Published Specification) No. 2,119,120 which combines a so-called pot life of 8 hours with short hardening times (Example 12). If a slight smeariness of the coating is accepted, according to the example quoted, a pot life of 24 hours is possible.

The process according to the invention thus offers the advantage of a faster rate of hardening (about 30%, compare Example 2 and 3) with considerably longer pot lives and a considerably better availability of the additives causing this effect.

The present invention comprises a process for the production of adhesion-reducing coatings by applying a solvent-containing mixture which is in itself known, consisting of (A) 100 parts by weight of an α,ω-dihydroxypolydimethylsiloxane having a viscosity between about $10^5$ and $5 \cdot 10^7$ cP and 20° C., (B) about 1 to 20, preferably about 3 to 8, parts by weight of a polyorganosiloxane which is terminally blocked with trimethylsiloxy groups, contains Si-bonded hydrogen and has about 10 to 40 CH$_3$Si(H)O units, and (C) about 1 to 20, preferably about 3 to 8, parts by weight of a heavy metal carboxylate or dialkyl-tin carboxylate, in particular dibutyl-tin diacetate, as a crosslinking accelerator, which is characterized in that before hardening at a relatively high temperature, (D) about 0.5 to 10, preferably about 1 to 5, parts by weight of a disilamorpholinesiloxane which is obtained by reacting a chloromethylpolymethylsiloxane of the formula

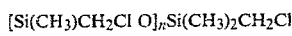

in which n denotes a value between about 4 and 100, with at most equivalent amounts of a primary amine H$_2$NR wherein R represents an alkyl or alkenyl radical comprising about 4 to 18 C atoms or a cycloalkyl radical, in the presence of a proton acceptor, are added to the mixture.

The α,ω-dihydroxypolydimethylsiloxanes (A) to be employed within the scope of the present invention are products which are in themselves known. They are currently used in processes for the production of adhesion-reducing coatings. Their viscosity can be appropriately adjusted, within the claimed limits, by admixtures. Similar remarks apply to the polyorganosiloxane containing Si-hydrogen groupings. The Si-H-containing substances used in the present process are described by the following formula:

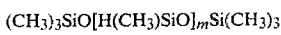

wherein m denotes a value between about 10 and 40.

Compounds (C), which are also known, such as dibutyl-tin diacetate, dibutyl-tin dilaurate, dioctyl-tin maleate and the like, are used to catalyze the crosslinking reaction.

The (D) disilamorpholinesiloxanes used according to the invention are a class of compounds which has not hitherto been known for coating processes. They can be prepared economically from starting substances which are available on a large industrial scale. The preparation is simple to carry out and is effected, in the presence of an organic solvent, by reacting a polychloromethylorganosiloxane of the formula

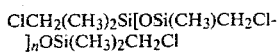

wherein n denotes a value from 2 to about 200, preferably between about 4 and 100, more preferably 15 and 25, with at most equivalent amounts of a primary amine.

As a result of fixing the lower limit of the index n at the value 4, the vapor pressures of the corresponding reaction products enable the products to be used safely in modern coating machines with hardening temperatures of more than 180° C. If use at lower temperatures is contemplated, values of n less than 4, for example from 2 to 200, would without exception be conceivable.

The reaction with at most equivalent amounts of a primary amine in organic solvents and in the presence of a proton acceptor leads to products containing disilamorpholine units of the formula:

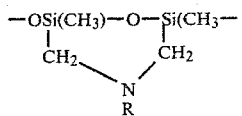

wherein R has the meaning given.

Suitable proton acceptors are tertiary amines such as triethylamine, pyridine, etc. If less than equivalent amounts of amine are reacted, unreacted chloromethylmethylsiloxy units are also still present. However, at least about 20% of the chloromethyl groups present should be reacted. Chloromethylpolymethylsiloxanes in which at least about 30 to 80% of the chloromethyl groups have reacted are preferably employed in the reaction, and the cyclohexyl radical is preferred as the radical R.

Examples of possible primary amines are: butylamines, hexylamine, cyclohexylamine, 2-ethylhexylamine and allylamine.

Their choice depends less on chemical considerations than on economy, accessibility and possibilities of convenient handling.

The process according to the invention is simple to carry out and, coupled with a very high rate of hardening, has a pot life which is partly determined by the evaporation of the solvent. It is several times the absolutely necessary time of about 8 hours, so that coating operations can without exception be interrupted for relatively long periods without the quality of the hardened coating later being reduced. For example, if after a relatively long time (more than 50 hours) the mixture has become too viscous for problem-free processing, as a result of evaporation of the solvent, it is entirely possible to dilute the mixture to the original concentration with solvent without the action of the product being impaired.

The disilamorpholinesiloxane is prepared, for example, in the following manner:

Chloromethyldimethylchlorosilane and chloromethylmethyldichlorosilane and hydrolyzed conjointly, and the product is equilibrated under acid conditions, neutralized if appropriate, dried and heated thoroughly.

A solvent, such as, for example, toluene, is added to the chloromethylsiloxane in an amount such that an approximately 15% strength solution of the siloxane results. A solution consisting of equivalent amounts of a primary amine (for example cyclohexylamine) and a four-fold excess of, for example, triethylamine is slowly added to this solution at 60° C. The mixture is stirred at 60° to 70° C. for 2 hours, cooled and filtered. The clear brownish solution is concentrated until an approximately 30% strength solution of the siloxane is obtained. If the residue has become turbid, it is filtered a second time. The "disilamorpholine" structure is confirmed by the nitrogen values of the "tertiary nitrogen" and by IR spectroscopy.

The process according to the invention will now be illustrated in still more detail with the aid of the examples which follow (% data relate to % by weight).

EXAMPLES

Example A (a) Preparation of

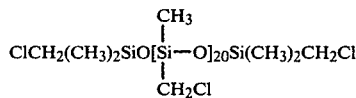

A mixture of 129 g [0.9 mol] of ClCH$_2$(CH$_3$)$_2$SiCl and 1,471 g [9 mols] of ClCH$_2$(CH$_3$)SiCl$_2$ is introduced into 3,600 g of H$_2$O, while stirring, taking care that during the addition the temperature does not rise substantially above 30° C. When the addition is complete, the reaction mixture is stirred for a further hour. The aqueous phase is separated from the hydrolysis product and discarded.

The siloxane phase is dried and then equilibrated at 150° C. for 5 hours (3% of bleaching earth).

Yield: 894 g; n$_D^{20}$: 1.4689; % Cl: 32.6%.

(a) Preparation of the disilamorpholinesiloxane 432 g of the above chloromethylsiloxane [3.97 g equivalents of chlorine] are mixed with 1,800 g of dried toluene and the mixture is heated to 60° C. A mixture of 1,212 g [12.00 mols] of triethylamine, 196.4 g [1.984 mols] of cyclohexylamine and 1,200 g of toluene is added dropwise to this solution in the course of 120 minutes. When the addition is complete, the mixture is stirred at 60° C. for 2 hours, cooled and filtered. The filtrate is then concentrated to 110° C. so that an approximately 28–30% strength solution in toluene is formed. After the solution has cooled, it is filtered over a filtration auxiliary.

Yield: 1,600 g of an approximately 28% strength siloxane solution in toluene.

The N analysis of the product, freed from solvent, shows the following values: % of basic N: 3.08; % of primary N: 0.01; % of secondary N: 0.26; and % of tertiary N: 2.82.

The 28% strength solution is employed in each of the following examples.

Example 1

50 g of an α,ω-polymethylsiloxanediol with a viscosity of about 10$^6$ cP at 20° C. are dissolved in 800 g of toluene, and 3.75 g of an Si-hydrogen-containing siloxane with trimethylsiloxy terminal groups and 30 CH$_3$Si(H) units, 4 g of dibutyl-tin diacetate and 2.15 g of the disilamorpholinesiloxane solution described above are successively added.

The hardening was carried out in a drying oven at 150° C., without internal air circulation. A No. 20 doctor blade was used in each case. The substrate consisted of a Kraft paper weighing 75 g/m$^2$. The assessment was carried out 15 seconds after the coated paper had left the drying oven (cooling) by rubbing very vigorously with the fingertip. If the slightest of marks is made during this operation, the assessment is negative. The hardening temperature was 150° C.

| Time between the preparation and application of the solution | Hardening time | Assessment |
| --- | --- | --- |
| 0 hour | 7 seconds | + |
| 1 hour | 7 seconds | + |
| 2 hours | 7 seconds | + |
| 3 hours | 7 seconds | + |
| 4 hours | 7 seconds | + |
| 5 hours | 7 seconds | + |
| 8 hours | 7 seconds | + |

Example 2

A mixture, characterized as No. 2, according to Example 1, with the exception that only 3 g of dibutyl-tin diacetate were employed with 50 g of α,ω-polymethyldisiloxane, was tested by comparison with 2 mixtures from the process according to DT-AS (German Published Specification) 2,119,120. The three mixtures differed in that one mixture according to DT-AS (German Published Specification) 2,119,120 (designated Experiment 2 a) contained, instead of the silamorpholinesiloxane, a copolymer which had been prepared from 5 parts by weight of (CH$_3$)$_3$-SiO[CH$_3$Si(H)O]$_{30}$Si(CH$_3$)$_3$, 1 part of H$_2$N-(CH$_2$)$_3$Si(OC$_2$H$_5$)$_3$ and 1 mol of H$_2$O per mol of aminopropylsilane, according to the data in column 5, lines 5–40. A further mixture, characterized as 2 b, contained, as the amine component, the reaction product, prepared according to column 4, lines 16-34, from 10 parts by weight of a polymethylsiloxane containing Si-bonded hydroxyl groups and about 7 $(CH_3)_2SiO$ units and 1 part by weight of $H_2N(CH_2)_3—Si(OC_2H_5)_3$. The amounts added to the mixtures in each case corresponded to the data in Example 1 of DT-AS (German Published Specification) No. 2,119,120. Unless indicated otherwise, the test conditions were the same as in Example 1.

| Time A | Time B | Experiment 2 | No. 2 a | No. 2 b |
|--------|--------|--------------|---------|---------|
| 0 | 7 | + | + | + |
| 1 | 7 | + | + | + |
|   | 10 |   |   |   |
| 2 | 7 | + | + | − |
|   | 10 |   |   | + |
| 3 | 7 | + | + | − |
|   | 10 |   |   | + |
| 4 | 7 | + | + | − |
|   | 10 |   |   | + |
| 5 | 7 | + | + | − |
|   | 10 |   |   | + |
| 6 | 7 | + | + | − |
|   | 10 |   |   | + |
| 7 | 7 | + | + | − |
|   | 10 |   |   | + |
| 8 | 7 | + | − | − |
|   | 10 |   | + | + |

Time A in hours: Time between the preparation and the application
Time B in seconds: Hardening time
Doctor blade: No. 40

Example 3

The pot life of a mixture as described in Example 2 (Experiment 2) was tested.

The product was exposed to the atmosphere at room temperature in an open beaker, without being stirred. The average relative atmospheric humidity was 53%.

The product was tested as in Example 1.

| Time A hours | Time B seconds | Result |
|--------------|----------------|--------|
| 0 | 7 | + |
| 4½ | 7 | + |
| 20 | 7 | + |
| 72 | 10 | + |
| 72* | 10* | +* |
| (after 7 days* | 10* | +*) |

However, after 40 hours the solution thickened somewhat, but without coating difficulties with the doctor blade occurring as a result of the increased viscosity. In a further experiment, such a solution, in which the thickening was obviously only effected by the evaporation of the solvent, was again filled up to the original mark with solvent. This experiment was marked with a star.

Non-agitated solutions are able to attain a pot life of 7 days.

Example 4

A mixture according to Example 2 was used for machine coating of paper. A temperature of 110° C. was available in the drying tunnel (3 m). Hardening was effected with a residence time of the paper in the drying tunnel of: A=60 seconds, B=30 seconds, C=15 seconds and D=7.5 seconds.

Up to a residence time of 15 seconds, the silicone film had completely hardened after leaving the drying tunnel and passing over a cooling roller, so that the "fingertip stroke test" left no marks on the film. With a residence time of 7.5 seconds (D), the "fingertip stroke test" gave, after intermediate storage of 10 minutes, a surface free from marks.

The peel strengths using Tesaband 659 (manufacturer: Messrs. Beiersdorf AG) were 4.2 g/cm in the case of Experiment A and B, 9.6 g/cm of strip width in the case of Experiment C and 8.4 g/cm of strip width in the case of Experiment D.

The reduction in adhesion, measured with the same tape, was below 10% in the case of all experimental conditions.

It will be appreciated that the instant specification and examples are set forth by way of illustration and not limitation, and that various modifications and changes may be made without departing from the spirit and scope of the present invention.

What is claimed is:

1. In the production of a thin substrate having a reduced tendency to adhere by applying to the substrate a solvent-containing mixture comprising (A) 100 parts by weight of an α, ω-dihydroxypolydimethylsiloxane having a viscosity between $10^5$ and $5.10^7$ cP at 20° C., (B) about 1 to 20 parts by weight of a polyorganosiloxane which is terminally blocked with trimethylsiloxy groups, contains Si-bonded hydrogen and has about 10 to 40 $CH_3Si(H)O$ units, and (C) about 1 to 20 parts by weight of a heavy metal carboxylate or dialkyl-tin carboxylate, and then heating the substrate to harden the coating, the improvement which comprises including in the mixture applied to the substrate (D) about 0.5 to 10 parts by weight of a disilamorpholinesiloxane which is obtained by reacting a chloromethylpolymethylsiloxane of the formula

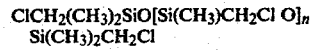

in which n denotes a value between 2 and 200, with at most an equivalent amount of a primary $C_{4-18}$ alkyl or alkenyl or cycloalkylamine in the presence of a proton acceptor.

2. A process according to claim 1, wherein n denotes a number between 15 and 25.

3. A process according to claim 1, wherein the amine for the preparation of the disilamorpholinesiloxane (D) is cyclohexylamine.

4. A process according to claim 1, wherein the disilamorpholinesiloxane (D) is employed in about 1 to 5 parts by weight.

5. Coated paper produced according to claim 1.

* * * * *